(No Model.)

L. L. JAMES.
WHIFFLETREE.

No. 342,965. Patented June 1, 1886.

WITNESSES
Thos Houghton.
Chas. F. Benjamin

INVENTOR
Lycurgus L. James,
By Wm. Conard
his Attorney

UNITED STATES PATENT OFFICE.

LYCURGUS L. JAMES, OF MEDORA, INDIANA.

WHIFFLETREE.

SPECIFICATION forming part of Letters Patent No. 342,965, dated June 1, 1886.

Application filed September 26, 1885. Serial No. 178,235. (No model.)

*To all whom it may concern:*

Be it known that I, LYCURGUS L. JAMES, a citizen of the United States, residing at Medora, in the county of Jackson and State of Indiana, have invented certain new and useful Improvements in Whiffletrees; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates both to double and single trees; and its objects are, first, to provide a serviceable trace-hook; and, secondly, to provide a center fastening allowing vertical swing to the tree and capable of adjustment as a draft-equalizer.

Figure 1:
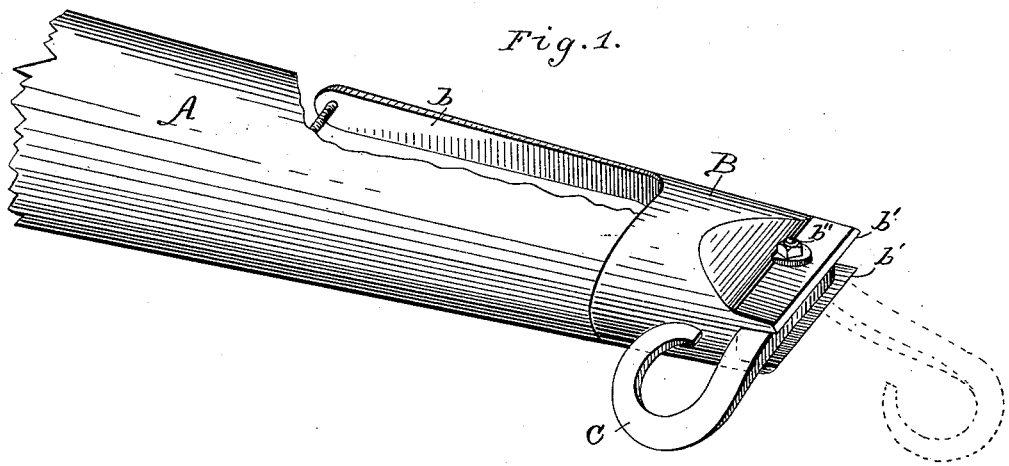
Figure 2:
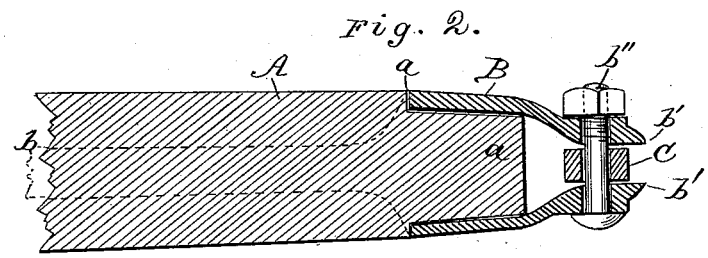
Figure 3:
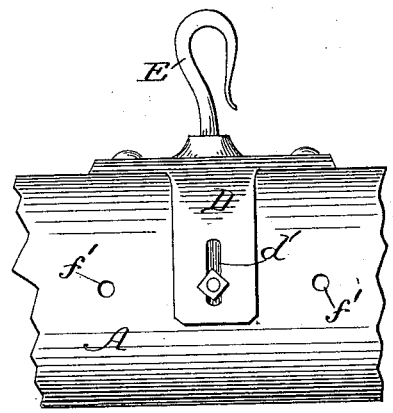
Figure 4:
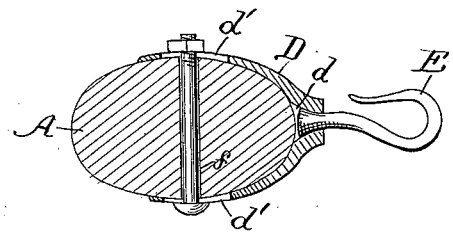

In the accompanying drawings, wherein like letters represent like parts, Figure 1 is a perspective of part of a whiffletree, showing certain features of the invention; Fig. 2, a longitudinal vertical section of the same; Fig. 3, a perspective view of the center hook and attachments, and Fig. 4 a vertical cross-section of the same.

A is a whiffletree, formed into a tenon, $a$, at each end.

B is a ferrule to fit upon each tenon, terminating in one direction in a brace, $b$, bolted to the rear surface of the tree, to secure the ferrule and strengthen the tree, and in the other direction in lips $b'$, which receive a hook, C, said hook being suitably provided with an eye at its base, to receive a pivot-bolt, $b''$, passing through the lips of the ferrule. The lips and bolt are so far beyond the end of the tenon as to free the hook from contact with the latter in turning. The curve of the hook C and its relation to the ferrule B in respect of size and adjustment are such that when a trace-ring is slipped upon the hook it cannot become disengaged without breakage or express manipulation.

D is a center clip to attach the whiffletree to a plow-beam or the running-gear of a wagon. It is made of malleable metal, so that it may be heated, opened, and closed down upon the tree. Holes may be cast in it, so that it may be bolted or nailed fast to the center of the tree. A round eye, $d$, countersunk on the inner and raised on the outer surface of the clip, is provided to receive the round shank and flat head of the hook E. The pivoting of the hook to the clip is convenient for plowing, as it enables the tree to be tilted at either end to clear a stump or other obstruction.

When fitted upon a double-tree, the clip D should be provided in each arm with corresponding slots $d'$, to receive a bolt passing through an eye, $f$, in the tree A, so that the clip may be securely centered. By providing an eye, $f'$, on each side of the eye $f$, the clip may be so adjusted as to practically equalize the draft when the horses are unequal in power. In double gear the clip should be used upon the pair of single-trees as well as upon the double-tree, and the hook E should be modified into a ring to engage with the hook C.

Having thus described my invention, what I claim to be new and useful, and desire to secure by Letters Patent, is the following:

1. A whiffletree-hook consisting in the combination of the clip D, having the eye $d$, with the hook E, all constructed and arranged as herein described, for the purpose of giving a tilting movement to the whiffletree, as herein set forth.

2. The combination, in a whiffletree, of the tree A, having tenons $a$, with the ferrules B, having braces $b$ and lips $b'$, and the hook C, in the manner herein set forth, for the purpose of conveniently attaching and holding the traces, as herein set forth.

3. The combination, in a whiffletree, of the tree A, having eyes $f'$ $f'$, with the clip D, having the slots $d'$, in the manner herein described, whereby the draft may be equalized, as herein set forth.

In testimony whereof I affix my signature in presence of two witnesses.

LYCURGUS L. JAMES.

Witnesses:
WILLIAM B. DECKERT,
JAMES A. KENNEDY.